(12) United States Patent
Brunstetter

(10) Patent No.: US 7,844,376 B2
(45) Date of Patent: Nov. 30, 2010

(54) INTERNAL MODE SWITCH BIT PATTERN FOR CLUTCH-TO-CLUTCH TRANSMISSIONS

(75) Inventor: Craig A. Brunstetter, Marysville, OH (US)

(73) Assignee: GM Global Technology Operations, Inc.

( * ) Notice: Subject to any disclaimer, the term of this patent is extended or adjusted under 35 U.S.C. 154(b) by 1128 days.

(21) Appl. No.: 11/468,029

(22) Filed: Aug. 29, 2006

(65) Prior Publication Data

US 2008/0065299 A1   Mar. 13, 2008

(51) Int. Cl.
*G06F 7/02*       (2006.01)
*B60K 20/02*    (2006.01)
*F16H 61/12*    (2010.01)

(52) U.S. Cl. ............................ 701/29; 701/64; 340/456

(58) Field of Classification Search ....................... None
See application file for complete search history.

(56) References Cited

U.S. PATENT DOCUMENTS

| | | | | |
|---|---|---|---|---|
| 5,090,269 A | * | 2/1992 | Ohtsuka et al. | ............... 74/335 |
| 5,325,083 A | * | 6/1994 | Nassar et al. | ............... 340/456 |
| 5,338,907 A | * | 8/1994 | Baker et al. | ............... 200/61.88 |
| 6,072,390 A | * | 6/2000 | Dourra et al. | ............... 340/456 |
| 6,205,390 B1 | * | 3/2001 | Holbrook et al. | ............... 701/62 |
| 7,247,121 B2 | * | 7/2007 | Takagi | ............... 477/34 |
| 7,568,402 B2 | * | 8/2009 | Robinette et al. | ............... 74/335 |
| 2005/0096821 A1 | * | 5/2005 | Tamaru et al. | ............... 701/51 |

FOREIGN PATENT DOCUMENTS

| DE | 4135362 A1 | * | 4/1993 |
|---|---|---|---|
| DE | 10227633 A1 | | 1/2004 |

\* cited by examiner

*Primary Examiner*—Michael J. Zanelli

(57) ABSTRACT

A method for determining a position of a range indication device for an automatic transmission is provided. The method includes: receiving N bits corresponding to a state of N circuits, respectively, wherein the N bits are related to a position of a range indication device and wherein the position includes transmission range states and transitional states between the transmission range states; associating the bit patterns with at least one of the transitional states and the transmission range states; defining the bit pattern having N bits equal to a first state as the transitional state, and defining the bit pattern having N/2 bits equal to one of the first state and a second state as the transmission range state.

20 Claims, 5 Drawing Sheets

| RANGE INDICATOR | CIRCUIT | | | |
|---|---|---|---|---|
| | A | B | C | P |
| Park | 0 | 1 | 1 | 0 |
| Reverse | 1 | 0 | 0 | 1 |
| Neutral | 1 | 1 | 1 | 1 |
| Over Drive (D6) | 1 | 1 | 0 | 0 |
| Manual Fourth (D4) | 0 | 0 | 1 | 1 |
| Manual Third (D3) | 0 | 1 | 0 | 1 |
| Manual Second (D2) | 1 | 0 | 1 | 0 |

| RANGE INDICATOR | CIRCUIT | | | |
|---|---|---|---|---|
| | A | B | C | P |
| Park | 0 | 1 | 1 | 0 |
| Reverse | 1 | 0 | 0 | 1 |
| Neutral | 1 | 1 | 1 | 1 |
| Over Drive (D6) | 1 | 1 | 0 | 0 |
| Manual Fourth (D4) | 0 | 0 | 1 | 1 |
| Manual Third (D3) | 0 | 1 | 0 | 1 |
| Manual Second (D2) | 1 | 0 | 1 | 0 |

*Figure 4*

MECHANICAL IMS POSITION

| Failure | Park | P to R | Rev | R to N | NEU | N to D6 | D6 | D6 to D4 | D4 | D4 to D3 | D3 | D3 to D2 | D2 |
|---|---|---|---|---|---|---|---|---|---|---|---|---|---|
| ABCP | 0110 | 0000 | 1001 | 0000 | 1111 | 0000 | 1100 | 0000 | 0011 | 0000 | 0101 | 0000 | 1010 |
| A-1 OPEN | 1110 Illegal | 0000 T2 | 1001 R | 0000 T2 | 1111 | 0000 T2 | 1100 D6 | 0000 T2 | 1011 Illegal | 0000 T2 | 1101 Illegal | 0000 T2 | 1010 |
| A-0 SHORT | 0110 P | 0000 T2 | 0001 Illegal | 0000 T2 | 0111 Illegal | 0000 T2 | 0100 D6 | 0000 T2 | 0011 | 0000 T2 | 0101 D3 | 0000 T2 | 0010 |
| B-1 OPEN | 0110 P | 0000 T2 | 1101 Illegal | 0000 T2 | 1111 N | 0000 T2 | 0100 Illegal | 0000 T2 | 0011 | 0000 T2 | 0101 D3 | 0000 T2 | Illegal |
| B-0 SHORT | 0010 Illegal | 0000 T2 | 1001 R | 0000 T2 | 1011 Illegal | 0000 T2 | 1100 D6 | 0000 T2 | 0111 Illegal | 0000 T2 | 0001 Illegal | 0000 T2 | 1110 |
| C-1 OPEN | 0110 P | 0000 T2 | 1011 Illegal | 0000 T2 | 1111 N | 0000 T2 | 1110 Illegal | 0000 T2 | 0011 | 0000 T2 | 0111 Illegal | 0000 T2 | 1010 |
| C-0 SHORT | 0100 Illegal | 0000 T2 | 1001 R | 0000 T2 | 1101 N | 0000 T2 | 1000 D6 | 0000 T2 | 0001 Illegal | 0000 T2 | 0101 D3 | 0000 T2 | 1000 |
| P-1 OPEN | 0111 Illegal | 0000 T2 | 1001 R | 0000 T2 | 1111 | 0000 T2 | 1101 Illegal | 0000 T2 | 0011 | 0000 T2 | 0101 D3 | 0000 T2 | Illegal |
| P-0 SHORT | Illegal | 0000 T2 | 1000 Illegal | 0000 T2 | 1110 Illegal | 0000 T2 | Illegal | 0000 T2 | 0010 Illegal | 0000 T2 | 0100 Illegal | 0000 T2 | 1011 |
| | 0110 P | 0000 T2 | 1001 R | 0000 T2 | 1111 | 0000 T2 | 1100 D6 | 0000 T2 | 0011 D4 | 0000 T2 | 0101 D3 | 0000 T2 | 1010 D2 |

1: Indicates OPEN Circuit to COMMON
0: Indicates CLOSED Circuit to COMMON

*Figure 5*

INTERNAL MODE SWITCH BIT PATTERN FOR CLUTCH-TO-CLUTCH TRANSMISSIONS

FIELD OF THE INVENTION

The present invention relates to methods and systems for indicating a state of a range indication device for automatic transmissions.

BACKGROUND OF THE INVENTION

An internal mode switch (IMS) is a component of a transmission used to relay the driver's selected range intent to a control system of a vehicle. The IMS is a sliding contact electrical switch assembly attached to a lower control valve body of the transmission. Conventional switches consist of two major components: a housing, which houses at least six tracks of conductive and non-conductive material that make up stationary contacts, and an insulator assembly, which makes up the moving contacts and is linked to an operator controlled shift lever. The six tracks include circuit A, circuit B, circuit C, circuit P, a park-neutral circuit, and a ground circuit.

The IMS is electrically connected to a control system of the vehicle via at least five wires (voltage is supplied to four and one is ground). Range detection is accomplished by securing the moving contacts of the IMS over the stationary contacts. For example, when a driver selects a PRNDL position, the shift lever causes IMS moving contacts to slide, which in turn grounds the four wires in a unique pattern for each PRNDL position. The bit pattern indicating the PRNDL position is comprised of A, B, C, and P circuits. The pattern is electronically communicated to the control system for interpretation.

The pattern provided to the control system is used for engine controls as well as determining transmission shift patterns. The input voltage level is high (ignition voltage) when the circuit is open and low when the circuit is closed to ground. It can be foreseen that a failure may occur in the IMS such that an inaccurate pattern is sent to the control system. A bit pattern strategy should be employed to detect all single point failure modes that may occur.

SUMMARY OF THE INVENTION

Accordingly, a method for determining a position of a range indication device for an automatic transmission is provided. The method includes: receiving N bits corresponding to a state of N circuits, respectively, wherein the N bits are related to a position of a range indication device and wherein the position includes transmission range states and transitional states between the transmission range states; associating the bit patterns with at least one of the transitional states and the transmission range states; defining the bit pattern having N bits equal to a first state as the transitional state, and defining the bit pattern having N/2 bits equal to one of the first state and a second state as the transmission range state.

In other features, a range indication device for indicating at least one of a range state and a transitional state to an automatic transmission control system is provided. The range indication device includes: a housing including N tracks that each include conductive and non-conductive material; a sliding mechanism that includes N contacts that align with the N tracks to form N circuits, wherein the sliding mechanism slides to M transitional positions and X range positions, and wherein the N circuits can be in at least one of a first state and a second state; and N signal generating devices that generate N signals based on the first state and the second state of the N circuits, and wherein the conductive material is positioned in the N tracks such that N circuits of the N circuits are in the first state when the sliding mechanism is in each of the M transitional positions.

In still other features, a fault detection system for a range indication device is provided. The fault diction system includes: a signal input device that receives a signal indicating states of N circuits within the range indication device; a control module that receives the signal via the signal input device, assembles the signal into a bit pattern, and associates the bit pattern with at least one of a transitional state, a range state, and an illegal state, wherein if the bit pattern is associated with the illegal state, a fault is detected; and wherein if the bit pattern indicates N circuits are in a first state the bit pattern is associated with the transitional state, if the bit pattern indicates N/2 circuits are in at least one of the first state and a second state the bit pattern is associated with the range state, and wherein otherwise the bit pattern is associated with the illegal state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a table illustrating the bit patterns for positive range states according to the present invention; and FIG. 5 is a table illustrating the bit patterns and fault detection method according to the present invention.

DETAILED DESCRIPTION OF THE PREFERRED EMBODIMENTS

Figure 1:
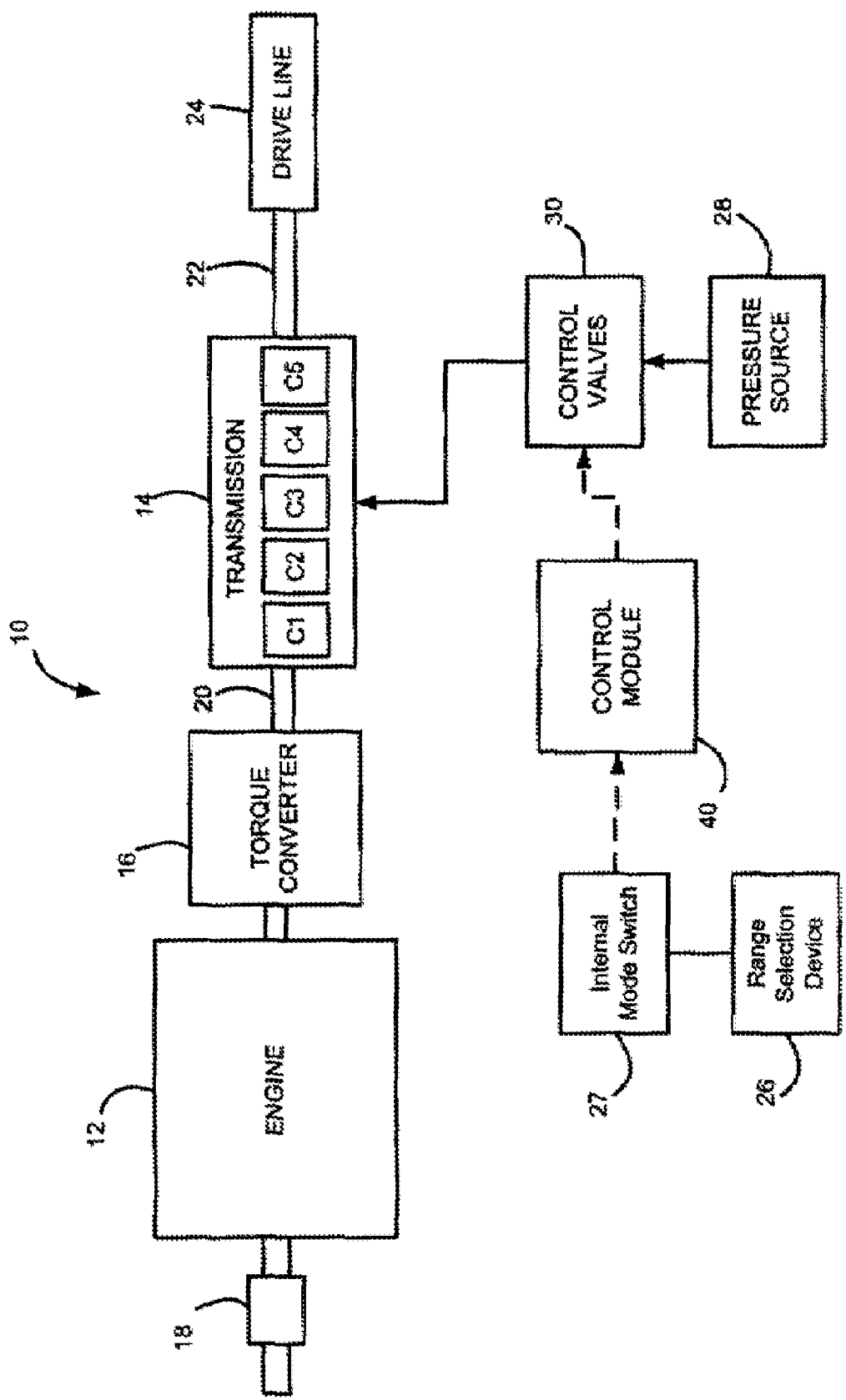
FIG. 1 is a functional block diagram of a vehicle including an automatic clutch-to-clutch transmission and an internal mode switch.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle is shown generally at 10. The vehicle includes an engine 12 that drives a transmission 14 through a torque converter 16. Air is drawn into the engine 12 through a throttle 18. The air is mixed with fuel and combusted within cylinders (not shown) of the engine 12 to produce drive torque. The torque converter 16 supplies the engine torque to the transmission via an input shaft 20. The transmission 14 in the exemplary embodiment is a multi-speed automatic clutch-to-clutch transmission that drives an output shaft 22 based on engine torque.

The output shaft 22 drives a driveline 24 of the vehicle 10. The speed and torque relationships between the engine 12 and the driveline 24 are controlled by hydraulically operated clutches C1, C2, C3, C4, and C5 of the transmission 14. Pressurized fluid is provided to the clutches from a regulated hydraulic pressure source 28. The clutches C1, C2, C3, C4, and C5 are coupled to the hydraulic pressure source via control valves 30, which regulate clutch pressure by supplying or discharging fluid to/from the clutches C1, C2, C3, C4, and C5.

A range selection device 26 enables an operator to set the transmission 14 at a desired operating range including, but not limited to, park, reverse, neutral, and one or more forward drive positions. The range selection device 26 is connected to an internal mode switch 27. An internal mode switch 27 generates mode signals. The mode signals indicate a bit encoding corresponding to states of four circuits of the internal mode switch 27. As can be appreciated, the internal mode switch 27 can include any number (N) of circuits and the mode signals can indicate a bit encoding corresponding to states for N circuits of the internal mode switch 27. A control module 40 receives the mode signals and interprets the mode signals as an IMS state according to a bit pattern of the present invention. The IMS state can be a transitional state, a range state, and an illegal state. Based on the interpreted IMS state, the control module determines the intended range and controls engine operation and transmission shift patterns based on the range. Further, the control module 40 can detect a fault in the switch 27 based on the bit pattern.

Figure 2:
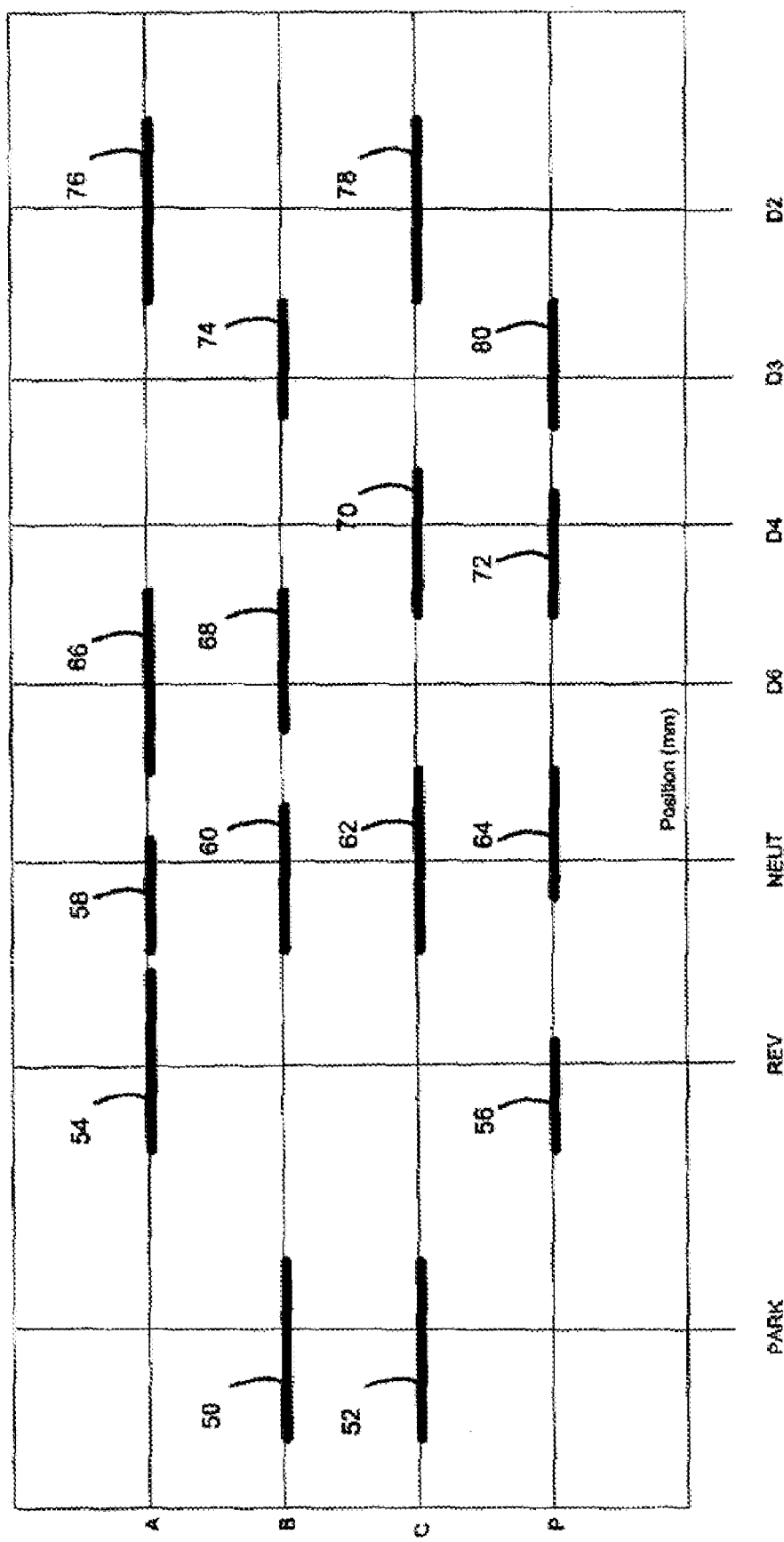
FIG. 2 is a diagram illustrating the placement of conductive tracks in an internal mode switch according to the present invention.

Referring now to FIG. 2, the diagram illustrates an exemplary placement of conductive tracks in an IMS 27 such that a bit pattern according to the present invention can be produced. Horizontal lines of the diagram correspond to tracks A, B, C, and P. The placement of conductive tracks is illustrated by darkened lines 50-80. Vertical lines of the diagram correspond to positive IMS states: park, reverse, neutral, drive 6, drive 4, drive 3, and drive 2. The area between the positive IMS states is considered transitional states. Placement of the conductive tracks 50-80 should be such that all circuits are closed when the IMS 27 is in a transitional state. In the alternative (not shown), placement of the conductive tracks can be such that all circuits are open when the IMS 27 is in a transitional state.

Figure 3:
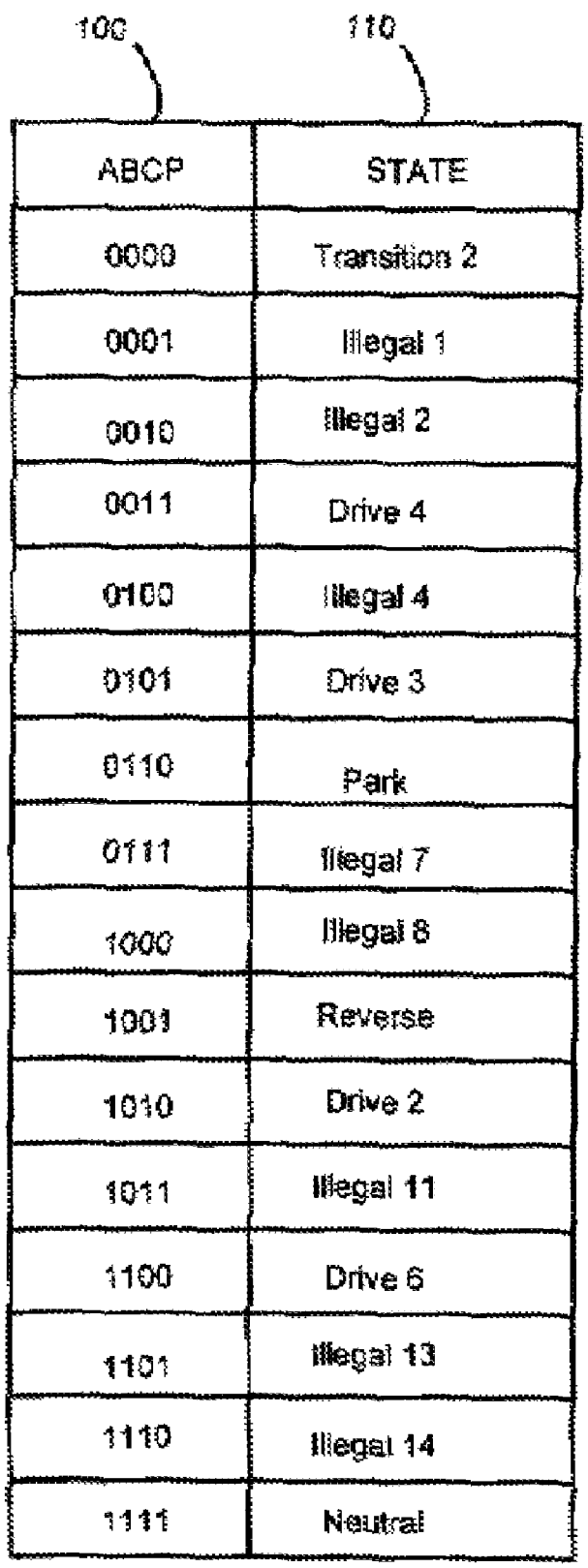
FIG. 3 is a table illustrating the bit patterns for valid, transitional, and illegal states according to the present invention.

Referring now to FIG. 3, a table illustrates bit patterns and their mapping to an IMS state according to the present invention. Each bit pattern includes bits A, B, C, and P which correspond to circuit A, circuit B, circuit C, and circuit P of the IMS respectively. The bit 0 indicates the circuit is closed to common. The bit 1 indicates the circuit is open to common. In an alternative embodiment, the bits can be inverted. In column 100, bit patterns are shown in ABCP format. In column 110, an IMS state that corresponds to the bit pattern is shown. IMS states can be, transitional, illegal, park, neutral, reverse, D2, D3, D4, and D6. According to the bit pattern mapping, a single transitional state is created between all positive IMS states. Thus creating eight (8) illegal bit patterns for diagnosing single point failures. The table of FIG. 4 illustrates the bit patterns that correspond to operating ranges of the transmission as requested by the operator via the range selection device. The controller determines the range based on these bit patterns.

Referring now to FIG. 5, a chart illustrates all single point failures that can be diagnosed with the bit pattern containing four bits. Column 200 lists the single point failures that can occur for circuits A, B, C and P where each circuit is either open or shorted. Row 210 lists the mechanical positions of the IMS. Mechanical positions can be: positive range states including park, reverse, neutral, drive 6, driver 4, drive 3, drive 2, and transitional states including park to reverse, reverse to neutral, neutral to drive 6, drive 6 to drive 4, drive 4 to drive 3, and drive 3 to drive 2. Shaded cells, for example cell 220, indicate failures that can be diagnosed given the current bit pattern. As can be appreciated, an IMS 27 with more or fewer tracks can similarly diagnose single point failures, so long as the bit pattern includes a single transitional state between each positive range state.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method for determining a position of a range indication device for an automatic transmission, comprising:
    receiving N bits corresponding to a state of N circuits, respectively, wherein said N bits are related to a position of said range indication device,
    wherein said position includes transmission range states and a transitional state between said transmission range states;
    defining a bit pattern for each of said transitional state and said transmission range states;
    wherein N bits of said bit pattern are set equal to a first state for said transitional state; and
    wherein N/2 bits of said bit pattern are equal to said first state and N/2 other bits of said bit pattern are equal to a second state for said transmission range states, where N is an even integer greater than one.

2. The method of claim 1 further comprising diagnosing a fault in the range indication device when said bit pattern is not defined as said transitional state and is not defined as one of said transmission range states.

3. The method of claim 1 wherein said transmission range states include park, reverse, neutral, drive 6, drive 4, drive 3, and drive 2.

4. The method of claim 1 wherein said N circuits have one of an open state and a closed state.

5. The method of claim 4 wherein said bit pattern includes at least one of zeros and ones, and wherein a zero bit of said bit pattern indicates an open state and a one bit of said bit pattern indicates a closed state.

6. The method of claim 4 wherein said bit pattern includes a plurality of at least one of zeros and ones, and wherein a zero of said bit pattern indicates a closed state and a one of said bit pattern indicates an open state.

7. A range indication device for indicating at least one of a range state and a transitional state to an automatic transmission control system, comprising:
    a housing including N tracks each with conductive and non-conductive material;
    a sliding mechanism that includes N contacts that align with said N tracks to form N circuits,
    wherein said sliding mechanism slides to M transitional positions and X range positions, and
    wherein said N circuits can be in at least one of a first state and a second state; and
    N signal generating devices that generate N signals based on states of said N circuits, respectively, wherein said conductive material is positioned in said N tracks such that each of said N circuits are in said first state when said sliding mechanism is in each of said M transitional positions, and wherein N, M and X are integers.

8. The range indication device of claim 7 wherein said conductive material is positioned in said N tracks such that N/2 circuits of said N circuits are in said first state and N/2 other circuits of said N circuits are in said second state when said sliding mechanism is in said X range positions.

9. The range indication device of claim 8 wherein said first state corresponds to an open state of said N circuits and wherein said second state corresponds to a closed state of said N circuits.

10. The range indication device of claim 8 wherein said first state corresponds to a closed state of said N circuits and wherein said second state corresponds to an open state of said N circuits.

11. The range indication device of claim 10 wherein said N signal generating devices generate at least one of a high signal and a low signal, and wherein a high signal corresponds to an open state of a corresponding one of said N circuits and a low signal corresponds to a closed state of a corresponding one of said N circuits.

12. The range indication device of claim 7 wherein X is equal to seven and said X range positions are park, reverse, neutral, drive 6, drive 4, drive 3, and drive 2.

13. The range indication device of claim 7 wherein said conductive tracks are positioned such that Z circuits of said N circuits are in one of said first state and said second state when a short of one circuit of said N circuits occurs and wherein Z is an odd integer less than N.

14. The range indication device of claim 7 wherein said M transitional positions are positions between said X range positions.

15. A fault detection system for a range indication device, comprising:
a signal input device that receives a signal indicating states of N circuits within the range indication device; and
a control module that receives said signal via said signal input device, assembles said signal into a bit pattern, and associates said bit pattern with at least one of a transitional state, a range state, and an illegal state,
wherein when said bit pattern is associated with said illegal state, a fault is detected, and
wherein:
when said bit pattern indicates N circuits are in a first state, said bit pattern is associated with said transitional state,
when said bit pattern indicates N/2 circuits of said N circuits are in said first state and N/2 other circuits of said N circuits are in a second state, said bit pattern is associated with said range state, and
otherwise said bit pattern is associated with said illegal state.

16. The fault detection system of claim 15 wherein said range state of the range indication device can be at least one of park, reverse, neutral, drive 6, drive 4, drive 3, and drive 2.

17. The fault detection system of claim 15 wherein said states of said N circuits are at least one of an open state and a closed state.

18. The fault detection system of claim 17 wherein said bit pattern includes a zero for said closed state and a one for said open state.

19. The fault detection system of claim 18 wherein said bit pattern includes a one for said open state and a zero for said closed state.

20. The fault detection system of claim 15 wherein said transitional state is a state between range states of the range indication device.

* * * * *